E. S. JOHNSON.
SPRING TIRE.
APPLICATION FILED MAR. 3, 1921.
1,395,420.
Patented Nov. 1, 1921.
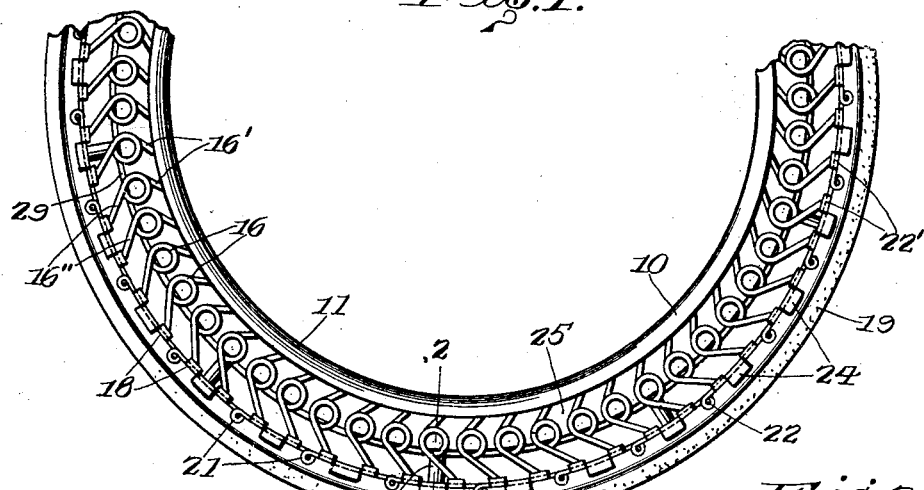
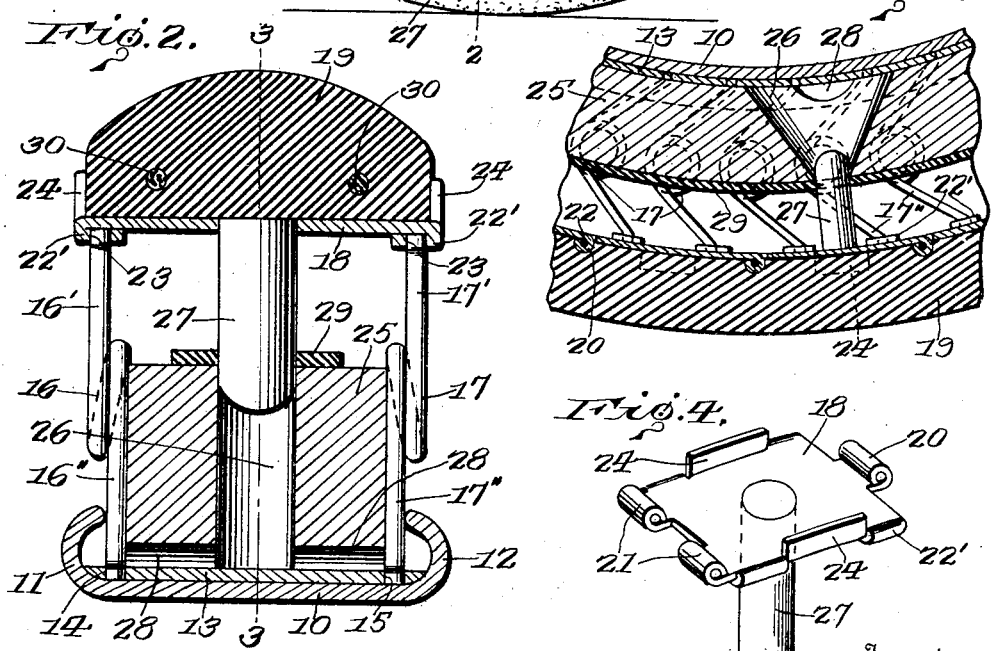
Inventor
E. S. Johnson

UNITED STATES PATENT OFFICE.

EVANS S. JOHNSON, OF LOUIS, OKLAHOMA.

SPRING-TIRE.

1,395,420.  Specification of Letters Patent.  Patented Nov. 1, 1921.

Application filed March 3, 1921. Serial No. 449,382.

*To all whom it may concern:*

Be it known that I, EVANS S. JOHNSON, a citizen of the United States, residing at Louis, in the county of Harmon, State of Oklahoma, have invented certain new and useful Improvements in Spring-Tires; and I do hereby declare the following to be a full, clear, and exact description of the invention, such as will enable others skilled in the art to which it appertains to make and use the same.

This invention relates to spring tires for vehicles, of the type illustrated in the patent issued to me May 18th, 1920, No. 1,340,272, and it has for its object to provide such modification of the structure therein shown as will sustain the tread of the tire against lateral displacement with respect to the rim.

A further object of the invention is to provide an improved means for mounting the rubber tread. Other objects and advantages will be apparent from the following description.

In the drawings:

Figure 1 is a side elevation showing a portion of a tire embodying the present invention.

Fig. 2 is a section on line 2—2 of Fig. 1 with the parts inverted and with the springs and guide pins in elevation.

Fig. 3 is a section on line 3—3 of Fig. 2, on a smaller scale and with the parts inverted with respect to Fig. 2 so as to have the positions corresponding to Fig. 1.

Fig. 4 is a detail perspective view of one of those links forming the tread carrying band, that has a pin for holding the link and therewith the band, against lateral displacement.

Fig. 5 is a bottom plan view of the link shown in Fig. 4 but on a smaller scale.

Referring now to the drawings, the present tire comprises a rim 10, the side edges of which have outwardly directed curved flanges 11 and 12 between which is provided upon the outer periphery of the rim, a metallic band 13 adjacent each edge of which is a circumscribing series of perforations 14 and 15 respectively.

In connection with the band 13 is employed two series of helical springs 16 and 17 respectively, each of one and one-half convolutions approximately and the end portions 16′ and 16″ and 17′ and 17″ are directed normally at substantially right angles to each other. The end portions 16″ are engaged in the series of perforations 14 while the end portions 17″ are engaged in the series of perforations 15, these perforations constituting seats for the spring ends. The outer end portions 16′ and 17′ of the springs, are engaged with the links 18 of a flexible band or belt upon which is mounted the continuous rubber tread 19.

Each link 18 has at one end an integral tubular ear 20 and at its other end a pair of integral tubular ears 21, the ear 20 of each link being disposed between the ears 21 of the next link and pivotally connected thereto by means of a pintle 22 passed through them. At each corner of each link 18 is an integral finger 22′ and these fingers are adapted to lie against the under face of the link and are provided with perforations 23 and in corresponding perforations 23 are received the end portions 16′ and 17′ of the helical sustaining springs.

From the same sides of each link 18 from which project the ears 22′, there project also ears 24 which are directed outwardly at right angles to the links and which closely embrace the sides of the rubber tread band 19 so that said band is yieldably supported about the rim 10.

Between the end portions 16″ and 17″ and the major portions of the helices of the springs is a wooden spacer block 25 that is mounted upon the band 13 and which sustains the springs against inward lateral movement and thus holds the tread against lateral movement with respect to the rim 10. At intervals, the spacing block 25 has openings 26 formed radially through it, the openings being narrowed circumferentially of the block from their inner to their outer ends, as shown in Fig. 3. Slidably fitted in the minor outer ends of these openings 26 are the inwardly directed pins 27 of corresponding links 18. When the tire yields to pressure, the tread band 19 and therewith its carrying band formed by the links 18, is pressed toward the rim 10, at which time the corresponding pin or pins 27 are forced into the openings 26 and the inward spreading of these openings provides room to permit of the pins 27 rocking in the plane of the tire. At the inner ends of the openings 26 are formed passages 28 that extend transversely through the block 25 and permit of egress of foreign matter that may accumulate in the openings.

In order to reinforce the spacer block 25, it is provided with a metal encircling band 29 while the rubber tread 19 may be provided with any desired number of cables 30 to give it strength.

What is claimed is:

1. The combination with a rim having a pair of spaced circumscribing series of seats on its outer face, of a spacer block encircling the rim between the series of seats, two series of helical springs contacting opposite sides of the spacer block and engaged in the corresponding series of seats, a tread band sustained by the outer ends of the helical springs and a tread sustained by the band.

2. The combination with a rim, of a spacer block mounted upon the rim and having radially extending openings therethrough, a tread band encircling and spaced from the spacer block and having pins slidably engaged in corresponding openings, a tread mounted upon the tread band and yieldable means at opposite sides of the spacer block for supporting the tread band from the rim.

3. The combination with a rim having an encircling spacer block with seats at both sides thereof, of helical springs engaged at one end in the seats and lying against opposite faces of the spacer block, a tread band comprising pivotally connected links having perforated fingers against their inner faces constituting seats in which the outer ends of the springs are received and a tread mounted upon and encircling the tread band.

In testimony whereof I affix my signature.

EVANS S. JOHNSON.